United States Patent
Bauer et al.

(10) Patent No.: US 6,767,574 B2
(45) Date of Patent: Jul. 27, 2004

(54) MICROBIOLOGICALLY STABLE COOKING SYSTEM

(75) Inventors: Roland Bauer, West Milford, NJ (US); Kenneth Gimelli, Waldwick, NJ (US); Birgitha Tray, Alpine, NJ (US); Bert Kuil, Vlaardingen (NL); Nicolaas Jan Verhoef, Vlaardingen (NL); Stephanie Doan, North Brunswick, NJ (US)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 22 days.

(21) Appl. No.: 10/369,261

(22) Filed: Feb. 18, 2003

(65) Prior Publication Data

US 2003/0161930 A1 Aug. 28, 2003

Related U.S. Application Data

(63) Continuation of application No. 09/565,019, filed on May 4, 2000, now Pat. No. 6,548,100.
(60) Provisional application No. 60/135,382, filed on May 21, 1999.

(51) Int. Cl.[7] ................................................ A23L 1/39
(52) U.S. Cl. ....................... 426/589; 426/601; 426/602; 426/638; 426/650
(58) Field of Search ................................ 426/601, 602, 426/589, 604, 638, 650

(56) References Cited

U.S. PATENT DOCUMENTS

| | | |
|---|---|---|
| 3,563,768 A | 2/1971 | Melnick |
| 4,034,124 A | 7/1977 | van Dam |
| 4,220,671 A | 9/1980 | Kahn et al. |
| 4,539,215 A | 9/1985 | Schweid et al. |
| 4,656,047 A | 4/1987 | Kok et al. |
| 4,946,693 A | 8/1990 | Risler et al. |
| 4,963,376 A | 10/1990 | Nafisi-Movaghar |
| 5,008,124 A | 4/1991 | Wilson |
| 5,232,732 A | 8/1993 | Harris et al. |
| 5,308,637 A | 5/1994 | Richards et al. |
| 5,424,088 A | 6/1995 | Christianson et al. |
| 5,679,300 A | 10/1997 | Lorenz et al. |
| 5,902,626 A * | 5/1999 | Hong et al. .................. 426/582 |
| 6,086,937 A * | 7/2000 | Bot et al. .................... 426/589 |
| 6,165,534 A | 12/2000 | Luzio et al. |
| 6,548,100 B1 * | 4/2003 | Bauer et al. ................. 426/589 |
| 6,586,033 B1 * | 7/2003 | Gimelli et al. .............. 426/589 |
| 6,596,336 B1 * | 7/2003 | Gimelli et al. .............. 426/589 |

FOREIGN PATENT DOCUMENTS

| | | |
|---|---|---|
| EP | 0 087 667 | 9/1983 |
| EP | 0 653 166 | 5/1995 |
| WO | 98/53694 | 12/1998 |

OTHER PUBLICATIONS

"Purity Gum 1773", CGB093, Technical Service Bulletin, National Starch and Chemical Company.
"Purity CSC", 32087–311, Technical Service Bulletin, National Starch and Chemical Company.
"N–Creamer 46", BHB041, Technical Service Bulletin, National Starch and Chemical Company, 1993.
"Industrial Gums: Polysaccharides and Their Derivatives", R.L. Whistler, Second Edition, Academic Press, NY 1973.

* cited by examiner

Primary Examiner—Lien Tran
(74) Attorney, Agent, or Firm—Edward A. Squillante, Jr.

(57) ABSTRACT

A complementary combination liquid/paste sauce composition and a dry, particulate seasoning composition, both of which are interdependent for effective cook up is taught. The sauce is fluid and thus has a selected amount of water and could be subject to microbiological attack which in turn requires pH control. The seasoning component is designed to buffer acidic taste of the the sauce composition to achieve selected taste.

11 Claims, 18 Drawing Sheets

Salmonella 5 strains (S.newport; 4031; S.agona; 14028; 4931)

(4,999,994 Version 2)
0.2 Sorbic
0.1 Benzoate (4,999,993 Version 2)

(4,999,995 Version 3)

(4,999,992 Version 2)

(4,999,991 Version 2)

*E.coli O157:H7*

0.15% Sorbic   0.3% Benzoate

Cheddar pH 4.3   Aw = 0.80

E.coli (strains: ATCC 35150, 48895, 380-94 FSIS Salami, 43889, JITBox)

MICROBIOLOGICALLY STABLE COOKING SYSTEM

This is a continuation of Ser. No. 09/565,019 filed May 4, 2000 now U.S. Pat. No. 6,548,100 B1 which claims the benefit of Ser. No. 60/135,382, filed May 21, 1999.

FIELD OF THE INVENTION

Generally the invention deals with a complementary at least two component cooking system for skillet or oven use which employs a dry, particulate, seasoning mix, containing a buffer and a separate liquid or paste sauce mix.

BACKGROUND OF THE INVENTION

Many products have been developed to assist in cooking meat or other protein. These include both dry mixes and liquid sauces.

U.S. Pat. No. 5,679,300 teaches a method and natural flavoring composition to impart deep-fried flavor without adding fat. The composition is used to coat a product to be cooked.

U.S. Pat. No. 4,963,376 teaches a sauce for coating foods to give them a brown color and crisp texture when used with a microwave oven.

U.S. Pat. No. 5,008,124 teaches a dry mix which can be applied to moistened meat pieces. The mix then liquefies to produce a thickened gravy or sauce on cooking.

U.S. Pat. No. 5,424,088 discloses a specially prepared combined starch-natural gum composition. This composition is used as a thickening agent.

The art has not addressed the problem of a combined dry seasoning mix/liquid sauce mix which are designed to be used together and to be complementary to each other. The art usually deals separately with either selected dry mixes or sauces having no functional connection between the seasoning mix and the sauce. This separate treatment limits the convenience of the product and limits the flavor nuances available.

It is accordingly an object of this invention to provide a combined complementary sauce and seasoning mix product. This has been accomplished with the result that this functionally related combination is very easy to use and produces excellent results and fresh taste on cook up of the end product.

Once the desirability of a two component sauce seasoning mix combination has been recognized, the next problem is how to manufacture it so that it is stable both physically and microbiologically and so that it provides the desired taste. Certain sauces must be liquid or fluid because of the delicacy of the flavors involved. Drying the flavor and seasoning components of the sauce significantly alters their flavor profile and reduces the perception of freshness. In addition, certain, sometimes irreversible, physical changes take place on drying.

Further, the sauce should contain a highly concentrated emulsion which must be easy to dilute on use. The emulsion, which can be a liquid or a paste, must be stable enough for dilution without breaking and further, the diluted emulsion itself must be stable enough to be heated after dilution. In addition, the emulsion must be sufficiently freeze-thaw and heat stable to allow shipment and storing in normal commercial channels.

The emulsion must also be microbiologically stable, which in turn requires a pH of 4.5 or less since the emulsion, to be fluid, will have a water activity of about 0.7 to 0.85. The pH adjustment for microbiological stability in turn could easily render many versions of the sauce too acidic for most tastes, especially dairy based sauces. Stability of the emulsion is also important in the stored product because if the emulsion breaks, localized pockets of high water activity may result, which in turn could result in microbiological instability.

SUMMARY OF THE INVENTION

It has now been found that a functionally interrelated combination of a dry seasoning mix containing a buffer and an acidified emulsified sauce mix with extremely high solids content and salt content can be prepared and used with the advantage of having good stability to dilution as well as to necessary freeze/thaw-heat cycles. To remedy the acid taste, a buffer is added to the seasoning mix to counteract the acidity of the sauce/diluted sauce emulsion. Further, the sauce mix is very microbiologically stable. It actually causes a 5 log decrease in organisms during a normal challenge test.

DETAILED DESCRIPTION OF THE INVENTION

Figure 1:
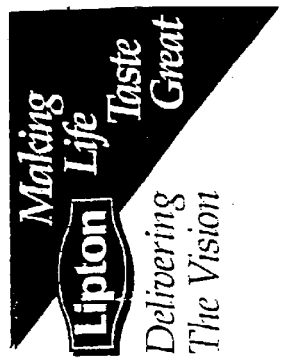
FIGS. 1–18 show data for challenge studies utilizing *E. coil* 0157:H7, Salmonella spp., and *Listens monocytogenes* as pathogens.
Figure 1:
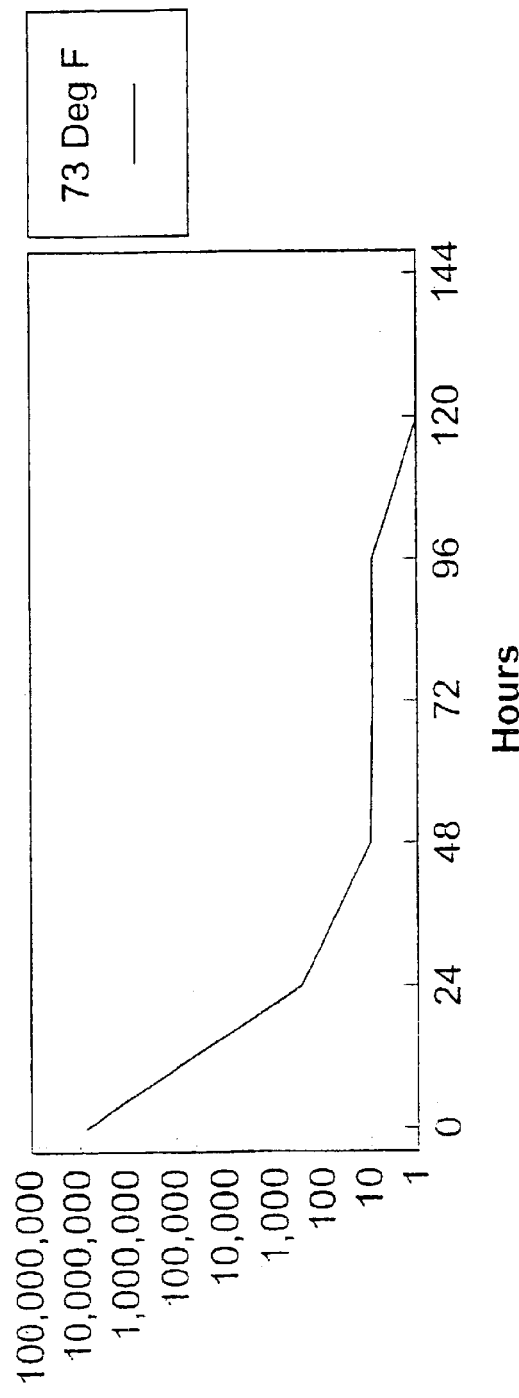
Figure 1:

In a preferred embodiment of the cooking process using the combined sauce and seasoning mix, there will be a series of cooking steps. Preferably, the dry seasoning mix is commingled with a protein source, such as chicken, to at least partially coat it and then the protein seasoning item is cooked. Chicken, or various other protein containing materials, may be cooked/roasted in the skillet or an oven dish after admixing with the dry mix, then a liquid is added, which could be water, milk, wine or other liquid. Usually the sauce is added last after the liquid. Alternatively, the sauce can be diluted with the liquid and the whole then added to the cooked materials. Further cooking is then done to complete the dish. Carbohydrates, such as pasta or rice and vegetables, may then be added during the final cooking steps or afterwards if desired.

The liquid sauce in order to be fluid has a certain amount of water employed and thus must be acidic to prevent bacteriological growth. In order to counteract this, a buffer is employed in the dry mix to improve the palatability of the total mixture on cooking, especially when the sauces are dairy based.

Several dry seasoning mixes are disclosed herein as well as several combinations of shelf stable sauces for use with dry seasoning mix and protein combinations.

The liquid/paste sauce mix is bacteriologically stable and indeed actually contributes to a five log bacteria kill in certain standard challenge tests. This stability is believed to be related to several individual parameters or hurdles as follows: a preservative or mixture of preservatives; a low water content or low water activity; a very high solids/salt content and an acidulant. This hurdle technology is to prevent mold, yeast and other bacterial growth, the preservative system, the low water content, the high solids and salt content and the acidulant all contribute to stability so there is no requirement to overload the food material with any single component. Since the sauce is highly concentrated, very high levels of salts and preservatives can be employed because it is meant to be diluted in use and so the high levels do not cause off-flavors. Additionally, because of the very high solids level care must be taken to develop an appropriate emulsion. The acidulant provides the acid, which improves the microbial stability and helps to achieve a microbial kill in the concentrated liquid sauce. This acidity, however, must be controlled on cook-up to achieve a palatable taste in the final product.

One embodiment of the "hurdle" approach is described in U.S. Pat. No. 6,022,576 hereby incorporated by reference. The steps in the instant invention are somewhat similar and include using a pH of about 3.0 to 4.5; using high solids and high levels of salt with the pH adjustments; limiting the amount of water; using selected well known preservatives such as nisin, natamycin, sorbic acid and sorbates and benzoic acid and benzoates. Together these steps contribute to the antimicrobial effect and thus individually each is incrementally antimicrobially effective.

Each of these steps produces at least incremental and frequently synergistic antimicrobial effects. None of them however, add or detract from the overall delicate flavor of the product. Rather, all of the steps are taken to improve microbiological stability without negatively affecting the flavor. Thus, the incrementally antimicrobially effective amounts must take into account the flavor profile of the product.

The buffering action of the spice, or herb, dry seasoning mix helps to control the acidity of the final product to improve palatability.

The dry spice seasoning mix may include herbs, spices and other salts and several formulations have been disclosed below. These contain essentially dry components, but may also include some small amount of fat components as well as the buffer. The buffer can be any standard buffer, but is preferably sodium bicarbonate.

The other buffers that may be used include, for example, sodium citrate, sodium phosphate, sodium carbonate, sodium hexametaphosphate, potassium citrate, potassium phosphate, potassium carbonate, potassium bicarbonate, potassium hexametaphosphate, sodium malate, potassium malate, glucono-delta lactone, as well as buffering salts of any food acids and in some cases including calcium or magnesium salts where appropriate.

The amount of buffer will be about 5 to 25% of the spice mix, depending on the pH desired. Usually the pH desired in the final cooked up product will be about 4 to 7 so that the final food does not have a sour taste unless a sour taste, such as for Teriyaki versions, is desired.

In addition to the spice seasoning mix used to cook with the protein source, in the method of the invention a liquid is employed, which may be water or milk or wine or other liquid, depending on the type of end dish desired. The amount of liquid varies depending on the liquidity desired by the consumer in the final dish.

The concentrate sauce, or stir sauce, can be fluid or paste and is a stabilized emulsion which contains about 20 to 40% water, about 15 to 40% oil, and about 25 to 65% solids, preferably 50% to 65%, which may be powders or other particulate solids. This includes about 2 to 18% sodium chloride, preferably 8 to 12% sodium chloride. An emulsifier, which may be egg (as commonly used and also as described in U.S. Pat. No. 4,034,124), or other emulsifiers, at a level of about 1 to 2% and Avicel 1340 at a level of 0.5 to 5%. Avicel contains carboxy methyl cellulose and sodium stearoyl lactylate (SSL) in ratios of about 70/30. The Avicel combination is preferably used at about 0.5 to 1.0%. The sodium stearoyl lactylate may used at a level of 0.25 to 2%. Carboxy methyl cellulose may also be used at a level of 0.5 to 5%.

In addition xanthan gum is employed which protects the carboxy methyl cellulose from coalescing or precipitation and helps to stabilize the emulsion. This gum also contributes to viscosity so only small amounts are preferred. The xanthan may be used at a level of 0.1 to about 0.25%.

A lipophilic starch may also be used such as an N-CREAMER 46 or Purity gum 1773. These are used in amounts of 1 to 5%, preferably 1.5 to 2.5%, and provide dynamic shock sensitive stabilization, eg. As shown by centrifugation. Further emulsifiers could be TWEEN 60, polysorbate 60 or any food grade emulsifier at a level of about 1 to 2% with an HLB of about 14 to 25. The emulsification incorporates the oil droplets into the water. The stabilizer then keeps the emulsified droplets from coalescing or precipitating. In addition to the xanthan gum, other conventional gums may be used at similar levels such as propylene glycol alginate, pectin, guar, carageenan, gum arabic, gum tragacanth or indeed any salt resistant gum.

Purity gum 1773 is a modified food starch derived from Waxy maize, having a unique emulsion stabilizing property. It is highly functional in emulsions of liquid foods containing fats and oils. This starch is used in the non dairy systems. It is cold water soluble and has high lipophilic properties resulting in excellent emulsion stability, as measured through centrifuge testing. In addition, Purity 1773 promotes Freeze-Thaw stability. In the system of the invention, this starch does not function as a bulking agent and does not add substantial viscosity to the concentrated sauce. This product is described in Technical Service Bulletin CGB093 from National Starch and Chemical Company. Other modified corn starches may also be used in the same amounts.

Microcrystalline cellulose, sometimes called Cellulose Gel, is a naturally occurring cellulose that has been purified. The microcrystalline cellulose portion is coprocessed with an emulsifying agent called sodium stearoyl lactylate. When combined together, Avicel 1340 has an excellent stabilizing capacity for thermal exposure throughout product life. The emulsion surpassed Hot Box testing at 110° F. (1 month), and at 95° F. (3 months). In addition, Avicel 1340 promotes Freeze-Thaw stability. Avicel 1340 imparts minimal viscosity to the finished product.

Purity gum CSC is a high viscosity modified food starch, derived from waxy maize, that can be used in many high pH food systems. It is a heat swelling and shear resistant starch, providing viscosity/thickness upon heat preparation. It is used in the invention in amounts of about 1 to 12%, preferably 2 to 7%. The starch remains inactive in the emulsified/concentrated sauce, but on heating increases in viscosity. It has a smooth short texture and will not set upon cooling. This product is described in Technical Service Bulletin 32087-311 from National Starch and Chemical Company.

N Creamer 46 is a modified food starch having an excellent emulsion stabilizing property. It is derived from waxy maize. This starch is used in the dairy systems of the invention only and provides a dairy flavor to the product. It is cold water soluble and has high lipophilic properties resulting in excellent emulsion stability, as measured through centrifuge testing. In addition, N Creamer 46 promotes Freeze-Thaw stability. In the system of the invention, this starch does not function as a bulking agent and does not add substantial viscosity to the concentrated sauce. This material is described in Technical Service Bulletin BHB041 from National Starch and Chemical Company.

S.D. Egg Yolk is a primary emulsifying agent containing naturally occurring lecithins, having both hydrophilic and hydrophobic properties. The spray dried egg is used in the non-dairy systems of the invention and it is not enzyme modified.

Salted Liquid Egg containing lecithin and having both hydrophilic and hydrophobic properties is used. This liquid egg yolk has been modified with the enzyme lecithase. The use of liquid modified egg yolks in the dairy mixes of the invention results in sauce with greater heat stability and provides a smoother and creamier finished product as described in U.S. Pat. No. 4,034,124.

Xanthan Gum provides protection properties for Avicel 1340. A discussion of the physical and chemical properties may be found in Industrial Gums, R. L. Whistler, Ed., academic Press, New York (1973).

The water activity is preferably 0.7 to 0.85 and may be as low as 0.5. The low end of the water activity (e.g. 0.5) has a high solids content and will make processing difficult and at the high end of water activity, it is difficult to get a microbial kill.

It has been found that the emulsion does have microbial kill and thus pasteurization is optional and the lack of heat improves the flavored freshness of the product. The preservatives employed are preferably sodium benzoate and/or sodium sorbate but nisin, natamycin and other microbiological preservatives may also be used, from about 3000 ppm to about 5,000 ppm in the emulsion so that upon dilution, the amount of preservatives will be about 50 ppm to 1200 ppm. The pH employed is 4.5 or lower or even 3.5 or 3.0 depending on taste. It must be below about 4.6 which is the CFR limit for low acid food. Depending on the pH and flavor desired in the sauce, the buffer in the seasoning mix must be adjusted to control the pH for selected taste.

A typical cook up method for the combined seasoning mix and sauce mix is to add oil to a small pan, heat the pan and add the protein, for example chicken pieces. The dry seasoning mix may then be sprinkled on the cooking protein and the mix then seared preferably for four to five minutes on high heat. After the protein is cooked, liquid is added to the protein in the pan, usually three cups, which may be water, milk, wine and the like depending on taste. The sauce is then preferably added to the pan and the whole mixture heated. Optionally, pasta or rice or other carbohydrates and vegetables, either frozen or fresh, are also added. The entire mixture may then be boiled to cook the optional carbohydrate or vegetable if used. The liquid and sauce could be pre-mixed before adding to the protein if desired.

The sauce is conveniently prepared using a two step process. Initially, the Avicel is added to water, followed by mixing in a high shear vessel. Xanthan and starch can be added using an oil slurry to protect the cellulose gel structure. The following are then incorporated into the mixing vessel: preservatives, egg, yolk, salt, flavors, onion, garlic, oil, spices, acids, cheese powders/pastes, etc. (as appropriate dependent on the sauce system). After each ingredient is added, the appropriate mix time is given to incorporate and hydrate the ingredients into a homogeneous mixture. The resultant mixture is a pre-emulsion of the final sauce.

The pre-emulsion is then passed through a vacuum system, processed through a high shear device (ex. a high pressure homogenizer, a rotor-stator mixer, or a colloid mill. Once homogenized, excess heat is removed through a heat exchanger to assure that the emulsion remains stable. It is then held in a mixing vessel under light agitation where particulates may be added to the final sauce. Once quality parameters are checked, it is ready to be packaged.

As used herein, the word "comprising" is intended to mean including but not necessarily "consisting essentially of", "consisting of" or "composed of". In other words, "comprising" the listed steps or options need not be exhaustive.

Except in the examples, or where otherwise explicitly indicated, all numbers in this description indicating amounts of material or conditions of reaction, physical properties of materials and/or use are to be understood as modified by the word "about." All amounts are by weight of the composition, unless otherwise specified.

Centrifuge Test

This test is used to establish emulsion stability. A 100 gram sample is placed in a centrifuge bottle and spun for twenty minutes at about 4,000 times gravity. Any oil separation is weighed. This test is then repeated on the same sample four times for the same amount of time for each repeat run. The oil separating out after each run is collected and weighed. If the total amount of oil separating out after five runs is 25% or less of the total oil in the sample, the emulsion is stable. The inventive emulsion thus has a centrifuge stability of about 25% or better. The less oil that separates out establishes a better and more stable emulsion.

The invention is illustrated by the following Examples.

I. Savory Herb Combination

A. Sauce

| Ingredient Name | Wt. | Percent Intermix | Typical Grams Per Pouch 89.6000 | Total % Per Pouch |
|---|---|---|---|---|
| Water | 40.00 | 29.423 | 26.3626 | 29.42% |
| Liquid Soybean Oil | 15.20 | 11.181 | 10.0178 | 11.18% |
| Salt Fine | 9.00 | 6.620 | 5.9316 | 6.62% |
| HVP innova | 8.34 | 6.135 | 5.4966 | 6.13% |
| Garlic | 1.20 | 0.883 | 0.7909 | 0.88% |
| Sucrose | 7.00 | 5.149 | 4.6135 | 5.15% |
| Starch-Purity 100-BG (C) Nat | 11.00 | 8.091 | 7.2497 | 8.09% |
| (C) Chicken Powder | 5.00 | 3.678 | 3.2953 | 3.68% |
| Disodium Salts | 0.20 | 0.147 | 0.1318 | 0.15% |
| Garlic Powder | | | 0.0000 | 0.00% |
| Phosphoric Acid | 0.61 | 0.449 | 0.4020 | 0.45% |
| Chix Mirapoix HR | 6.00 | 4.413 | 3.9544 | 4.41% |
| (C) Chicken Flavor | 13.00 | 9.562 | 8.5679 | 9.56% |
| Chicken fat 0.50050/Bx. | 15.20 | 11.181 | 10.0178 | 11.18% |
| Black Pepper | 0.66 | 0.485 | 0.4350 | 0.49% |
| Mushroom Extract | | | 0.0000 | 0.00% |
| Lactic acid | 0.68 | 0.500 | 0.4482 | 0.50% |
| Egg yolk | 1.10 | 0.809 | 0.7250 | 0.81% |
| (C) Xanthan Gum 100 Dr. | 0.26 | 0.191 | 0.1714 | 0.19% |
| Dehydrated Onions | 1.50 | 1.103 | 0.9886 | 1.10% |

B. Dry Seasoning Mix

| Ingredient Name | Enter Wt. Here | Percent Intermix | Typical Grams Per Pouch 26.32 | Total % Per Pouch |
|---|---|---|---|---|
| Salt | 0.5600 | 2.128 | 0.5600 | 2.13% |
| Sucrose | 0.4320 | 1.641 | 0.4320 | 1.64% |
| Garlic Granulated | 1.0000 | 3.799 | 1.0000 | 3.80% |
| Gran On-Spatini 250-Dr. (C) | 0.7200 | 2.736 | 0.7200 | 2.74% |
| Pepper Black Table | 0.2400 | 0.912 | 0.2400 | 0.91% |
| McCormick Herbs | 0.8000 | 3.040 | 0.8000 | 3.04% |

-continued

B. Dry Seasoning Mix

| Ingredient Name | Enter Wt. Here | Percent Intermix | Typical Grams Per Pouch 26.32 | Total % Per Pouch |
|---|---|---|---|---|
| de Provance Premix 20600 | 0.3200 | 1.216 | 0.3200 | 1.22% |
| Lawry Seasoning Salt | | | | |
| Chicken Fat | 0.4000 | 1.520 | 0.4000 | 1.52% |
| Encap Oleo Turmeric | 0.0480 | 0.182 | 0.0480 | 0.18% |
| Parsley Leaves | 0.1600 | 0.608 | 0.1600 | 0.61% |
| Red Bell Pepper Granulated | 0.6400 | 2.432 | 0.6400 | 2.43% |
| Sodium Bicarbonate | 1.0000 | 3.799 | 1.0000 | 3.80% |
| Phase Oil 6% Sterine | 20.0000 | 78.988 | 20.0000 | 75.99% |
| | Amount | Total Percent | Total Gram Per Pouch | Total % Intermix |
| | 26.3200 | 100.0000 | 26.3200 | 1.0000 |

II. Spanish Version

A. Sauce

| Ingredient | % Weight | LBS |
|---|---|---|
| Water | 31.7115% | 129.38 |
| Soybean Oil | 21.9664% | 89.62 |
| Salt | 9.2141% | 37.59 |
| HVP Innovation | 8.5894% | 35.04 |
| Purity CSC Starch | 4.9360% | 20.14 |
| Sucrose | 4.9029% | 20.00 |
| Chicken Flavor (White Meat) | 3.4376% | 14.03 |
| Onion Granules | 3.1241% | 12.75 |
| Garlic Granules | 2.8345% | 11.56 |
| SC Egg Yolk | 1.5000% | 6.12 |
| Purity 1773 Gum | 1.5000% | 6.12 |
| IDF Chicken Stock | 1.1691% | 4.77 |
| Coriander | 1.0431% | 4.26 |
| Avicel 1340 | 0.8000% | 3.26 |
| Lactic Acid | 0.6100% | 2.49 |
| Ground Cumin | 0.5645% | 2.30 |
| Phosphoric Acid | 0.5407% | 2.21 |
| Annato Color | 0.4913% | 2.00 |
| Disodium Salt | 0.2461% | 1.00 |
| Oleo Turmeric | 0.2461% | 1.00 |
| Sorbic Acid | 0.2000% | 0.82 |
| Jalapeno Pepper | 0.1406% | 0.57 |
| Xanthan Gum | 0.1250% | 0.51 |
| Sodium Benzoate | 0.1000% | 0.41 |
| EDTA | 0.0070% | 0.03 |
| TOTAL: | 100.0000% | 408.00 |

B. Dry Seasoning Mix

| Ingredient Name | Enter percent Intermix |
|---|---|
| Onion pieces dehydrated | 21.167 |
| Red bell pepper granules | 17.574 |
| Dehydrated onion powder white | 15.875 |
| Garlic powder | 9.744 |
| Yeast Ext. | 5.861 |
| Ground Cumin | 5.292 |
| Ground Paprika | 2.556 |
| Parsley leaves | 1.628 |

-continued

B. Dry Seasoning Mix

| Ingredient Name | Enter percent Intermix |
|---|---|
| Encapsulate oleo turmeric | 3.256 |
| Chicken fat | 0.936 |
| Coriander | 6.675 |
| Lime Flavor | 0.928 |
| Sodium Bicarbonate | 1.476 |
| | 7.030 |
| TOTAL PERCENT: | 100.00 |

III. Alfredo Sauce

A. Sauce

Alfredo Stir-In-Sauce is a single phase (non-separating) viscous product. The sauce is white colored and has a cheesy-salty flavor which is the flavor characteristic for this sauce; pH 4.20 ± 0.2; Aw 0.810 ± 0.02

| Component | % Weight |
|---|---|
| Water | 29.5289 |
| Oil Soybean | 28.3046 |
| Cheese Powder | 7.0838 |
| Sodium Chloride Salt Granular | 6.4767 |
| Cheese Paste | 8.1970 |
| Sweet Cream Powder | 5.0599 |
| Parmesan Cheese Flavor | 4.0479 |
| Corn Starch Modified Purity CSC | 3.0359 |
| Modified Liquid Egg Yolk 10% Salted | 1.8216 |
| Starch Modified Food N-Creamer 46 | 1.8216 |
| Butter Flavor | 1.5180 |
| Avicel SD 1340 | 0.8905 |
| Lactic Acid Food Grade 88% | 0.6477 |
| Phosphoric Acid 75% Food Grade | 0.5869 |
| Cheese Ingredient Blue Type | 0.4048 |
| Sodium Benzoate | 0.3036 |
| Sorbic Acid | 0.1619 |
| Xanthan Gum | 0.1012 |
| Calcium Disodium EDTA | 0.0075 |
| | 100.000000 |

B. Dry Seasoning Mix

| Component | % Weight |
|---|---|
| Sodium Chloride | 15.9432 |
| Sodium Bicarbonate | 15.9432 |
| Garlic Granulated | 15.9432 |
| Vegetable Pieces | 18.6057 |
| Onion | 8.5137 |
| Garlic Flavor | 5.3211 |
| Oil Cottonseed/Soybean Partially Hydrogenated | 4.7832 |
| Spices | 5.5801 |

-continued

B. Dry Seasoning Mix

| Component | % Weight |
|---|---|
| Sucrose | 3.9858 |
| Herbs | 5.3808 |
| | 100.000000 |

IV. Savory Herb

A. Sauce

Savory Herb Stir-In-Sauce is a single phase (non separating) viscous product. The sauce is a pale yellow mustard colored and has a salty-chicken and herb flavor which is characteristic for this sauce; pH 4.00 ± 0.2; Aw 0.800 ± 0.02

| Component: | % Weight |
|---|---|
| Water | 31.7826 |
| Oil Soybean | 23.2771 |
| Sodium Chloride Salt Granular | 8.0460 |
| Starch Corn Modified Purity CSC | 6.7050 |
| Corn Protein Hydrolyzed, Vegamine 83D | 5.7471 |
| Flavor | 9.5403 |
| Chicken Broth Frozen | 4.7893 |
| Onion Granulated | 1.7816 |
| Egg Yolk Spray Dried | 1.6284 |
| Starch Purity Gum 1773 | 1.5326 |
| Garlic Powder | 1.1494 |
| Onion Powder | 0.9579 |
| Cellulose Gel Avicel Plus DS 1340 | 0.8429 |
| Lactic Acid Food Grade 88% | 0.5651 |
| Phosphoric Acid H3PO4 75% Food Grade | 0.5077 |
| Butter Flavor Sauteed | 0.2874 |
| Spice | 0.4119 |
| Sorbic Acid | 0.2107 |
| Xanthan Gum | 0.1149 |
| Sodium Benzoate | 0.1149 |
| Calcium Disodium EDTA | 0.0072 |
| | 100.000000 |

B. Dry Seasoning Mix

| Component | % Weight |
|---|---|
| Sodium Chloride Salt Multi Purpose | 21.2464 |
| Vegetable Pieces | 18.7779 |
| Onion White Minced | 15.6482 |
| Onion Powder | 11.8340 |
| Sodium Bicarbonate | 10.3982 |
| Oil Cottonseed/Soybean Partially Hydrogenated | 4.9764 |
| Spice | 7.4485 |
| Poultry Seasoning Flavor | 1.6939 |
| Parsley Leaves Natural | 1.7604 |
| Paprika Ground | 1.6352 |
| Color Caramel | 1.6352 |
| Color | 2.9457 |
| | 100.000000 |

V. Spanish

A. Sauce

Spanish Stir-In-Sauce is a single phase (non separating) viscous product. The sauce is pumpkin color and has a salty-cumin flavor which is the flavor characteristic for this sauce; pH 4.00 ± 0.2; Aw 0.740 ± 0.02

| Component | % Weight |
|---|---|
| Water | 31.0882 |
| Oil Soybean | 22.1477 |
| Sodium Chloride | 9.2741 |
| Corn Protein Hydrolyzed, Vegamine 83D | 8.6945 |
| Starch Corn Modified Purity CSC | 4.8303 |
| Sucrose | 4.8303 |
| Flavor Chicken White Meat Type | 3.8642 |
| Onion Granulated | 3.1880 |
| Garlic Granulated | 2.8982 |
| Starch Purity Gum 1773 | 1.5940 |
| Egg Yolk Spray Dried | 1.5070 |
| Chicken Broth | 0.9661 |
| Spices | 1.6809 |
| Cellulose Gel Avicel Plus SD 1340 | 0.8501 |
| Lactic Acid Food Grade 88% | 0.6183 |
| Phosphoric Acid H3PO4 75% Food Grade | 0.5506 |
| Color | 0.7149 |
| Flavor | 0.2512 |
| Acid Sorbic | 0.2125 |
| Xanthan Gum | 0.1159 |
| Sodium Benzoate Dense Powder | 0.1159 |
| Calcium Disodium EDTA | 0.0071 |
| | 100.000000 |

B. Dry Seasoning Mix

| Component | % Weight |
|---|---|
| Onion White Minced | 21.5057 |
| Dehydrated Vegetable Pieces | 17.8571 |
| Onion Granulated | 16.0674 |
| Onion Granulated | 16.0674 |
| Garlic Powder | 10.1461 |
| Sodium Bicarbonate | 7.1023 |
| Spices | 11.2825 |
| Sodium Chloride Salt | 5.4627 |
| Oil Cottonseed/Soybean Partially Hydrogenated | 5.0811 |
| Parsley Leaves Natural | 3.0438 |
| Flavor Lime | 1.5016 |
| Color | .9497 |
| | 100.000000 |

VI. Teriyaki

A. Sauce

Teriyaki Stir-In-Sauce is a single phase (non-separating) viscous product. The sauce is chocolate colored and has a salty, sesame and soy sauce flavor which is the flavor characteristic for this sauce; pH 4.20 ± 0.2; Aw 0.720 ± 0.02

| Component | % Weight |
|---|---|
| Soy Sauce | 19.5141 |
| Soybean Oil | 17.3565 |
| Water | 16.6628 |
| Sucrose | 16.3527 |
| Sodium Chloride Salt | 8.7214 |
| Flavor | 6.0324 |
| Corn Starch Modified Purity CSC | 2.7254 |
| Vinegar Rice Wine | 2.3075 |
| Monosodium Glutamate Monohydrate | 2.1804 |

A. Sauce

Teriyaki Stir-In-Sauce is a single phase (non-separating) viscous product. The sauce is chocolate colored and has a salty, sesame and soy sauce flavor which is the flavor characteristic for this sauce; pH 4.20 ± 0.2; Aw 0.720 ± 0.02

| Component | % Weight |
|---|---|
| Starch Purity Gum 1773 | 1.9987 |
| Egg Yolk Spray Dried | 1.8170 |
| Color | 1.3627 |
| Garlic Flavor | 0.9993 |
| Cellulose Gel Avicel Plus SD 1340 | 0.7995 |
| Lactic Acid Food Grade 88% | 0.3543 |
| Phosphoric Acid H3PO4 75% Food Grade | 0.3180 |
| Acid Sorbic | 0.1999 |
| Gum Xanthan | 0.1817 |
| Sodium Benzoate | 0.1090 |
| Calcium Disodium EDTA | 0.0067 |
|  | 100.000000 |

B. Dry Seasoning Mix (The mix does not contain buffer.)

| Component | % Weight |
|---|---|
| Onion Granulated | 22.2816 |
| Vegetable Pieces | 17.0503 |
| Sucrose | 15.5003 |
| Sodium Chloride | 12.4002 |
| Orange Peel Granulated | 11.6407 |
| Ginger Flavor | 5.1732 |
| Oil Cottonseed/Soybean Partially Hydrogenated | 5.1307 |
| Herbs | 4.0688 |
| Seasoned Salt Premix | 3.8479 |
| Garlic Flavor | 2.9063 |
|  | 100.000000 |

VII. Lemon Garlic

A. Sauce

Lemon Garlic Stir-In-Sauce is a single phase (non-separating) viscous product. The sauce is tan gravy-like color and has salty, chicken, garlic flavor which is characteristic for this sauce; pH 4.00 ± 0.2; Aw 0.720 ± 0.02

| Component | % Weight |
|---|---|
| Water | 30.0618 |
| Oil Soybean | 17.8301 |
| Sucrose | 8.1950 |
| Sodium Chloride Salt | 7.7130 |
| Flavor Chicken White Meat Type | 6.7488 |
| Chicken Broth | 4.8206 |
| Starch Corn Modified Purity CSC | 4.8206 |
| Corn Protein Hydrolyzed | 4.3385 |
| Flavor | 2.8924 |
| Garlic Powder | 1.9282 |
| Soy Protein Hydrolyzed | 1.9282 |
| Egg Yolk Spray Dried | 1.5426 |
| Starch Purity Gum 1773 | 1.5426 |
| Onion Granulated | 1.3498 |
| Onion White Powder | 0.9641 |
| Cellulose Gel Avicel Plus SD 1340 | 0.8484 |
| Garlic Flavor | 0.6942 |
| Lactic Acid Food Grade 88% | 0.5206 |
| Phosphoric Acid H3PO475% Food Grade | 0.4628 |
| Yeast Extract | 0.3471 |
| Acid Sorbic | 0.2121 |
| Xanthan Gum | 0.1157 |
| Sodium Benzoate | 0.1157 |
| Calcium Disodium EDTA | 0.0071 |
|  | 100.000000 |

B. Dry Seasoning Mix

| Component | % Weight |
|---|---|
| Vegetable Pieces | 26.5252 |
| Sodium Chloride | 17.6835 |
| Maltodextrin 9 to 15 Detrose Equivalent | 11.0522 |
| Garlic Granulated | 7.1132 |
| Sodium Bicarbonate | 7.1043 |
| Spice | 8.2935 |
| Sucrose | 3.4615 |
| Oil Cottonseed/Soybean partially Hydrogenated | 3.4529 |
| Herbs | 3.3156 |
| Flavor Lemon Juice | 3.2714 |
| Lemon Peel | 2.8470 |
| Color | 2.8470 |
| Flavors | 2.3077 |
| Turmeric Oleoresin Spray Dried | .7250 |
|  | 100.000000 |

A. Sauce

Cheddar Stir-In-Sauce is a single phase (non-separating) viscous product. The sauce is bright orange in color and has a salty-cheese flavor which is the main flavor characteristic for this sauce; pH 4.20 ± 0.2; Aw 0.800 ± 0.02

| Component | % Weight |
|---|---|
| Water | 32.0570 |
| Oil Soybean | 23.0556 |
| Cheese Powder | 16.7610 |
| Cheese Flavors | 7.0001 |
| Sodium Chloride | 5.5213 |
| Cheese Paste | 3.9438 |
| Modified Liquid Egg Yolk 10% Salted | 2.9578 |
| Starch Modified Food N-Creamer 46 | 2.3663 |
| Starch Corn Modified Purity CSC | 1.9719 |
| Onion Granulated | 1.0451 |
| Avicel SD 1340 | 0.8676 |
| Lactic Acid Food Grade 88% | 0.7296 |
| Phosphoric Acid H3PO4 75% Food Grade | 0.6507 |
| Mustard Flour | 0.4930 |
| Sodium Benzoate | 0.3155 |
| Acid Sorbic | 0.1578 |

-continued

A. Sauce

Cheddar Stir-In-Sauce is a single phase (non-separating) viscous product. The sauce is bright orange in color and has a salty-cheese flavor which is the main flavor characteristic for this sauce;
pH 4.20 ± 0.2; Aw 0.800 ± 0.02

| Component | % Weight |
|---|---|
| Xanthan Gum | 0.0986 |
| Calcium Disodium EDTA | 0.0073 |
| | 100.000000 |

B. Dry Seasoning Mix

| Component | % Weight |
|---|---|
| Minced Onions | 21.0911 |
| Vegetable Pieces | 17.6629 |
| Onion Granulated | 10.9510 |
| Sodium Citrate Dihydrate | 10.0357 |
| Sodium Chloride Salt | 8.4340 |
| Garlic Powder | 7.3020 |
| Pepper Black Medium | 5.8649 |
| Oil Cottonseed/Soybean Partially Hydrogenated | 5.0419 |
| Sodium Bicarbonate | 4.0143 |
| Herbs | 3.6129 |
| Spice | 4.4759 |
| Color | 1.5134 |
| | 100.000000 |

EXAMPLE IX

The liquid or paste sauces were formulated for ambient shelf stability (about 73° F.) to be packaged with or without atmosphere control, for example, nitrogen flush to remove oxygen. The product required a fresher taste unaffected by heat. Therefore, products were formulated to address microbiological shelf stability, as well as, pathogen reduction or survival. The objective was to formulate a product that would not support the growth of spoilage microorganisms and in the absence of pasteurization, would also deliver a 5-log reduction of key recognized food-borne pathogens that would have normally been targeted if heat or other process were applied.

The dynamics of bacterial death is typically logarithmic, with each 10% sub-population demonstrating increased levels of resistance. The 5-log reduction is a fairly conservative approach to ensure safety. It anticipates a relatively high contamination level and addresses the resistant sub-populations. Sauce formulation constituents were boosted to lower the pH to mildly acidify the sauces and lower Aw (Water Activity). Included were sorbic acid and sodium benzoate preservatives. Typically, these preservatives are used in foods to prevent spoilage or enhance shelf life. However, these have not been applied to achieve a 5-log reduction of key vegetative pathogens in place of other processing methods.

The pathogens used in the challenge studies were E. coli 0157:H7, Salmonella spp., and Listeria monocytogenes.

The objective was to evaluate the survival of E. coli 0157:H7, Salmonella spp., and L. monocytogenes in different flavor varieties of sauces. The sauces tested were very similar to the Examples herein: Three Cheese Alfredo Sauce (Example III), Teriyaki Sauce (Example VI), Savory Chicken Sauce (Example IV), Spanish Style Sauce (Example V), Cheddar Sauce (Example VIII), and Lemon Garlic Sauce (Example VII) for Chicken. The formulations tested were in some respects different from those listed under examples III to VIII inclusive. Specifically, in that the pH was varied some and the water activity was also varied.

Methodology

The strain sources were from the following collection:

E. coli 0157:H7 (35150; 48895; 43889; 380–94 FSIS Salami; JIT Box #145).
Salmonella spp. (4031; 8326; 4931; 14028; S. agona; S. newport).
Listeria monocytogenes (Lm 19111; Lm8; Lm10 Jalisco; CA-2; Lm 16 CA-1; Lm Scott A; Lm V7).

The bacteria were grown in BHI with 1% Glucose at 35° C. for 2 days. The tests included at least 4 different strains for each. The strains were pooled into three separate tubes to attain a target population of $10^8$–$10^9$/ml for each of the three pathogens. Sauce was aseptically added to individual sterile Whirl Pak pouches and weighed to contain 11–12 grams of sauce each. These sauce packets were inoculated using 0.1 ml of the individual bacterial pools, and mixed well by massaging the pouch exterior. Only one genus type pathogen was added to individual packets to avoid interaction. Enough packets were prepared to allow for daily destructive sampling and testing for up to 10 days. Uninoculated controls were also tested at the beginning, middle, and end of the test period.

Inoculated sauce was maintained in a controlled temperature environment to simulate ambient at 23° C. Packets were analyzed destructively each day. Butterfield's Buffers (99 ml) were used to prepare 1:10 dilutions. About 10 ml of buffer was added to each pouch to dilute the sauce and facilitate complete removal of sauce out of the pouch and into the buffer dilution blank.

E. coli 0157:H7 was enumerated using both Sorbitol MacConkey Agar (CTSMAC) and E. coli 3MpetriFilm at 35° C. (2–3 days). L. monocytogenes was enumerated using both Listeria Selective Agar (MOX) with added colistin (10 mg/L) and moxalactam (15 mg/L), and APC 3Mpetrifilm at 30° C. (2–3 days). Salmonella spp. was enumerated on Hektoen Enteric Agar and Xylose Lysine Desoxycholate Agar at 35° C. (2–3 days).

When sauce packets reached 4 days at 23° C. ambient, enrichment was performed in addition to direct enumeration. This enabled determination of survival (presence or absence) when counts were reduced below 10 cfu per gram. In place of Butterfield's Buffer, Tryptone Soy Broth (99 ml) supplemented with yeast extract was used to enrich sauces inoculated with E. coli 0157:H7 and sauces inoculated with Salmonella. Enrichment broths were incubated at 35° C. for 24 hours. E. coli TSBYE were spread plated onto SMAC (CTSMAC). Salmonella TSBYE were transferred (1.0 ml) to tubes of Tetrathionate Broth and Selenite Cystine Broth for 24 hours at 35° C. These were subsequently streaked onto HE and XLD using 3 mm loops and incubated for 24 hours at 35° C. For Listeria, enrichment was also performed in addition to direct enumeration. In place of Butterfield's Buffer, UVM Broth (99 ml) with added naladixic acid (20 mg/L) and acriflavine hydrochloride (25 mg/L) was used to enrich the sauce for 24 hours at 30° C. Secondary enrichment was performed using Fraser Broth for 24 hours and 48 hours at 30° C., with streaking onto MOX plates immediately at these times, and incubating at 30° C. for 2 days.

The data for these challenge studies have been graphed and included as FIGS. 1–18 inclusive. These graphs have been made on logarithmic scales, and demonstrate the log reductions taking population levels from 6 and 7 log levels down to less than 1 followed by complete die off, achieving a minimum 5 log reduction. Significant reduction was achieved within 48 hours at ambient (23° C.). Whereas, at refrigerated temperatures (10° C.) the effect was less. Due to potential inhibition of the sauce constituents (acids and salts) on bacterial growth within enumeration medium, counts may not be reliable on low dilution plates ($10^{-1}$ plates). Therefore, enrichments were performed to overcome the inhibition and identify presence or absence to determine survival and time of complete die off. The results show the minimum 5 log reduction was achieved with 2 days storage at ambient and greater than 5 logs within 5 days maximum. When sauce samples were chilled at 10° C. (50° F.), survival was extended (see Alfredo sauce results). Good enumeration was achieved on plates with dilutions $>10^{-1}$. Particularly good counts (consistently higher) were attained with E. coli 3MPetriFilm versus SMAC, and with APC 3MPetriFilm versus MOX. However, on $10^{-1}$. Plates, these were very unreliable showing clear zones of inhibition, and much better data was attained using SMAC and MOX in place of PetriFilm.

Specific formulation constituents were boosted to achieve product stability and deliver a minimum 5-log reduction of known vegetative pathogens. These constituents include sorbic acid and sodium benzoate. Typically, these preservatives are used in foods to prevent spoilage or enhance shelf life. However, these have not been applied to achieve a 5 log reduction of key vegetative pathogens in place of other processing methods, such as: heat or thermal processing; filtration (reverse osmosis); high pressure processing; microwaves, UV, X-ray, and gamma irradiation, or combinations of the above. The effect on pathogen survival and 5-log reduction is promoted using other sauce parameters, such as, Aw and pH (such as, using salt and added acidulants, for example, lactic acid and phosphoric acid, and with the addition of calcium disodium EDTA).

Figure 2:
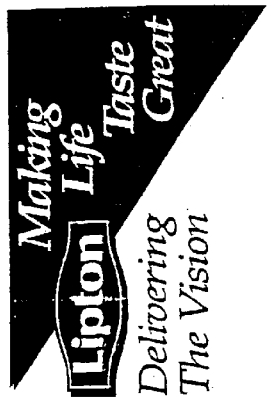
Figure 2:
Figure 2:
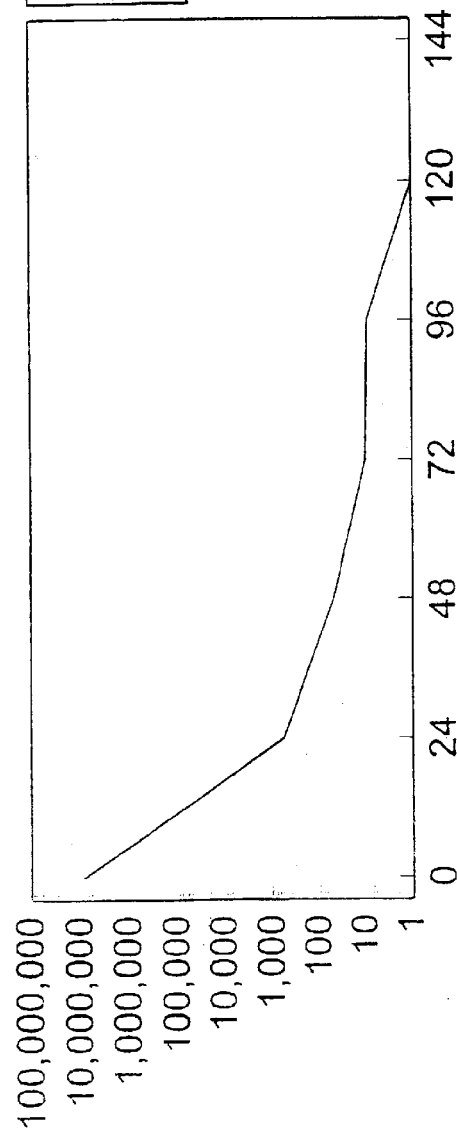
Figure 3:
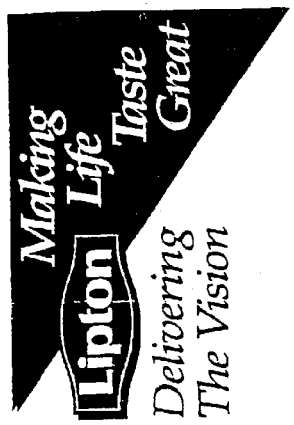
Figure 3:
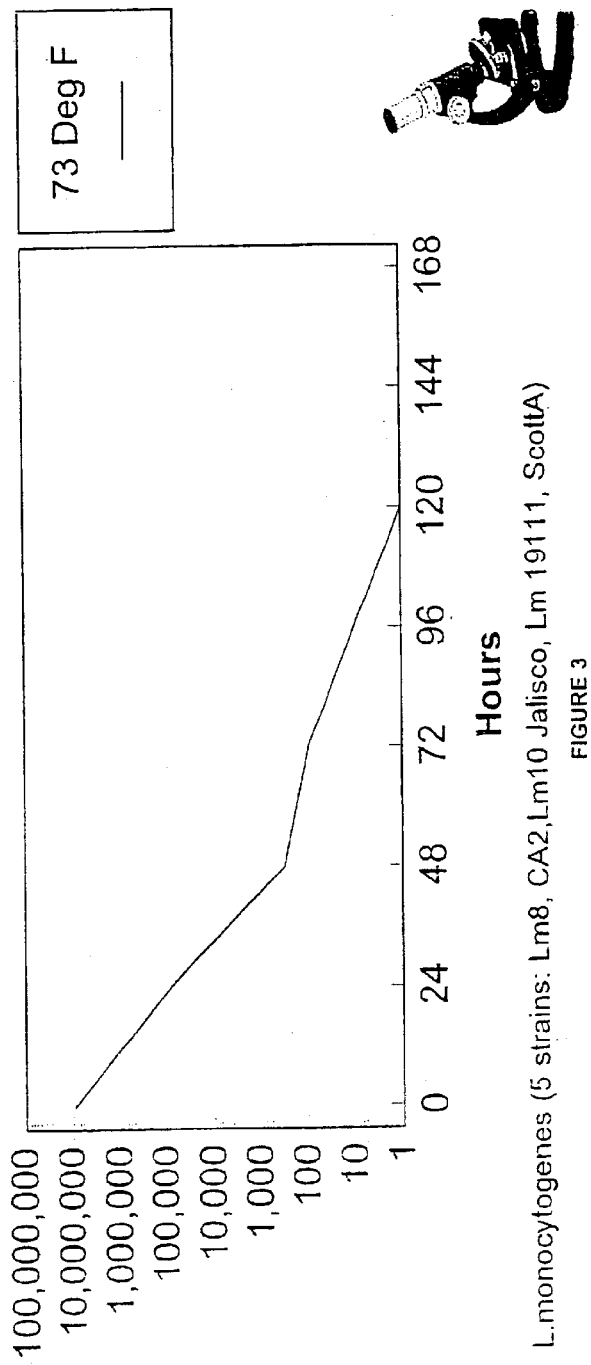

FIGS. 1, 2 and 3 represent Salmonella, E Coli and Listeria respectively with a formulation similar to Example III and 0.15% sorbic acid and 0.3% benzoate.

Figure 4:
Figure 4:
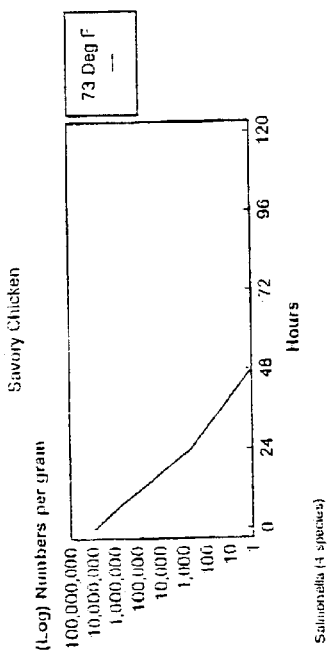
Figure 4:
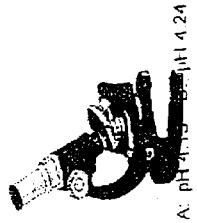
Figure 5:
Figure 5:
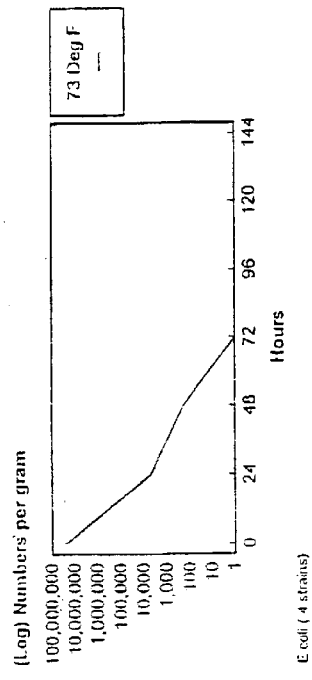
Figure 5:
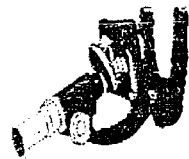
Figure 6:
Figure 6:
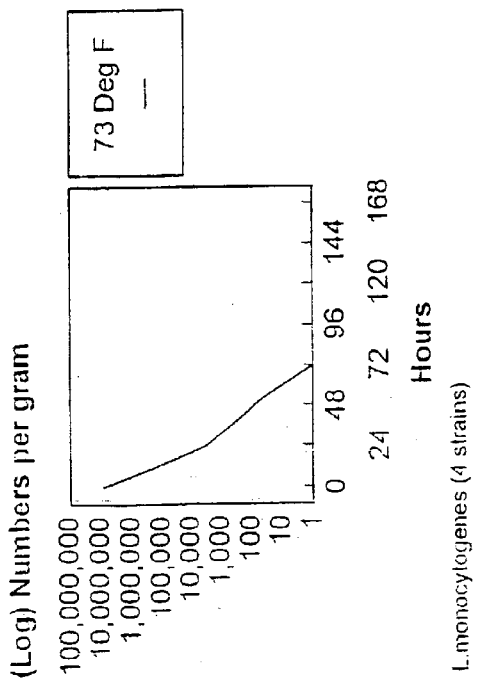
Figure 6:
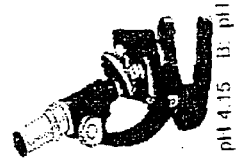

FIGS. 4, 5 and 6 represent Salmonella, E Coli and Listeria respectively with a formulation similar to Example IV and 0.2% sorbic acid and 0.1% benzoate.

Figure 7:
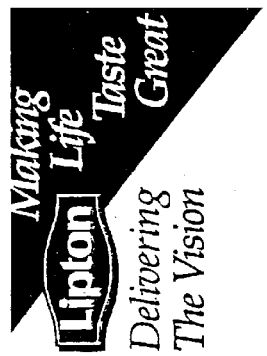
Figure 7:
Figure 7:
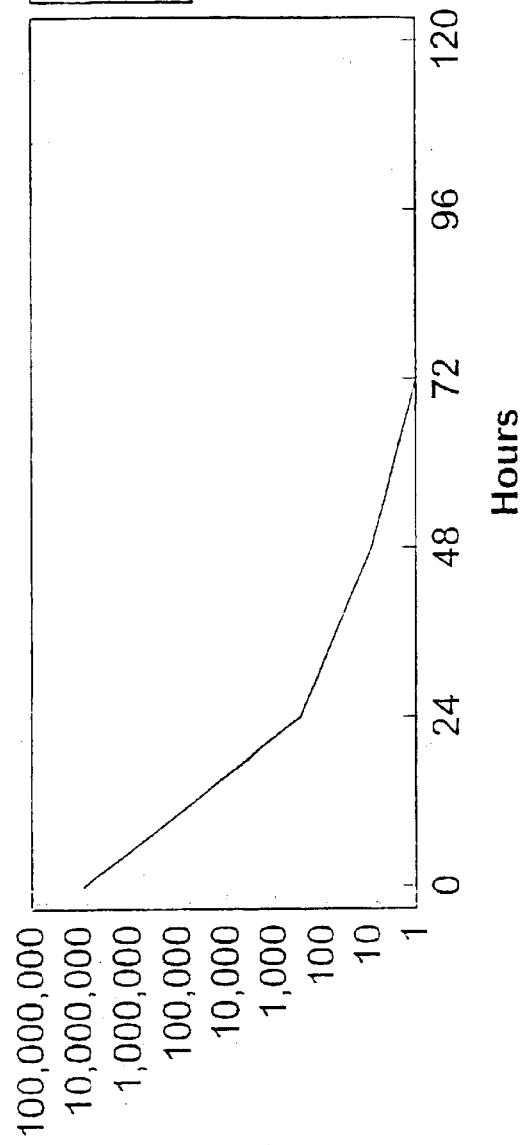
Figure 8:
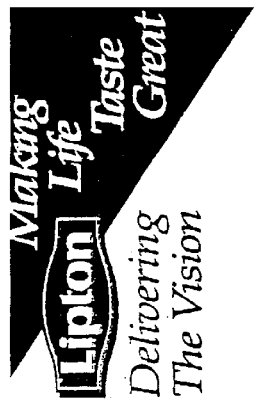
Figure 8:
Figure 8:
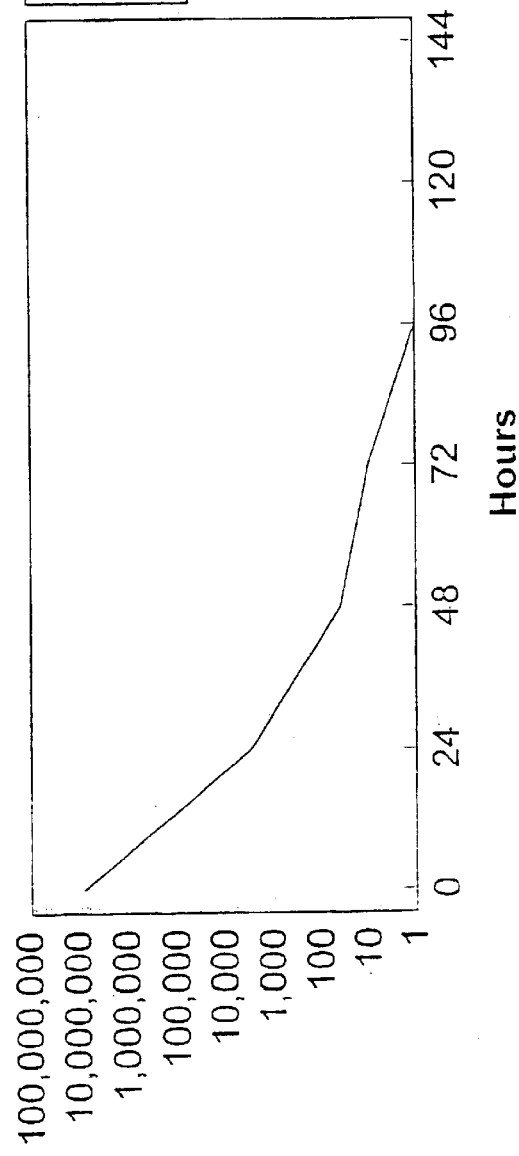
Figure 9:
Figure 9:
Figure 9:
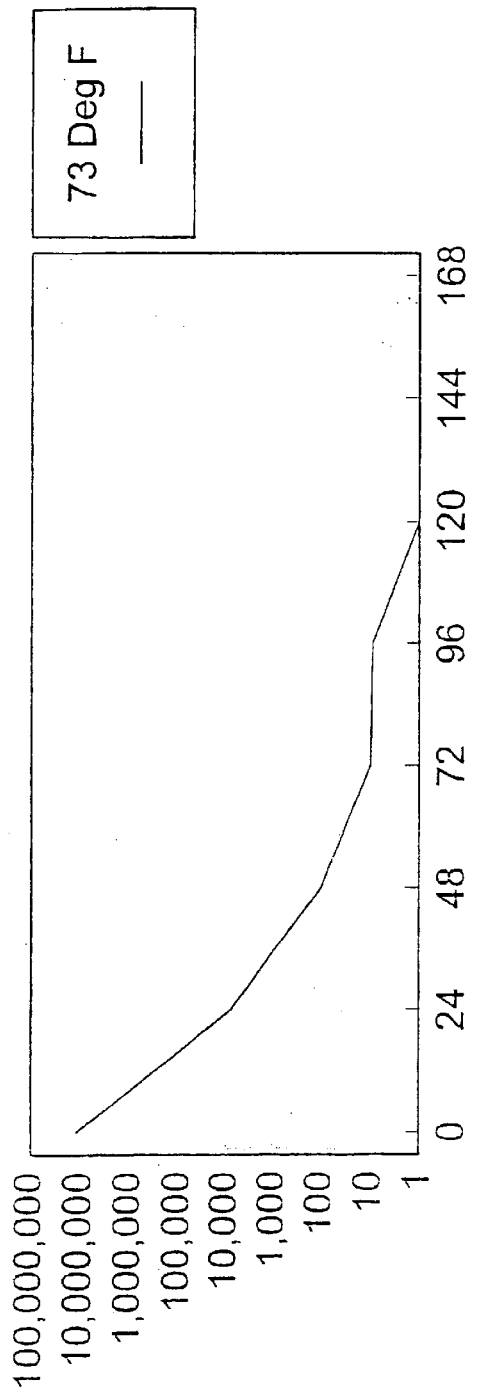

FIGS. 7, 8 and 9 represent Salmonella, E Coli and Listeria respectively with a formulation similar to Example V and with a formulation of 0.22% sorbic acid and 0.1% benzoate.

Figure 10:
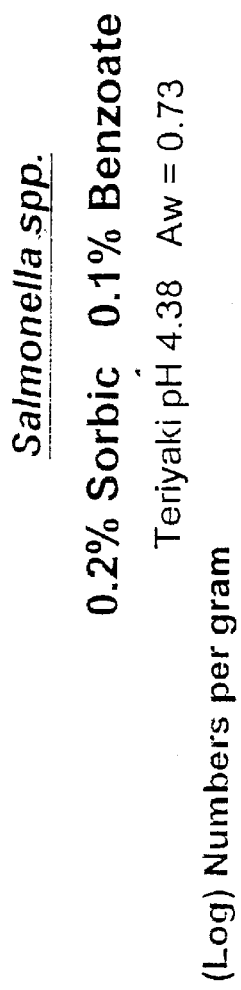
Figure 10:
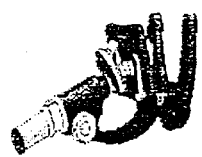
Figure 11:
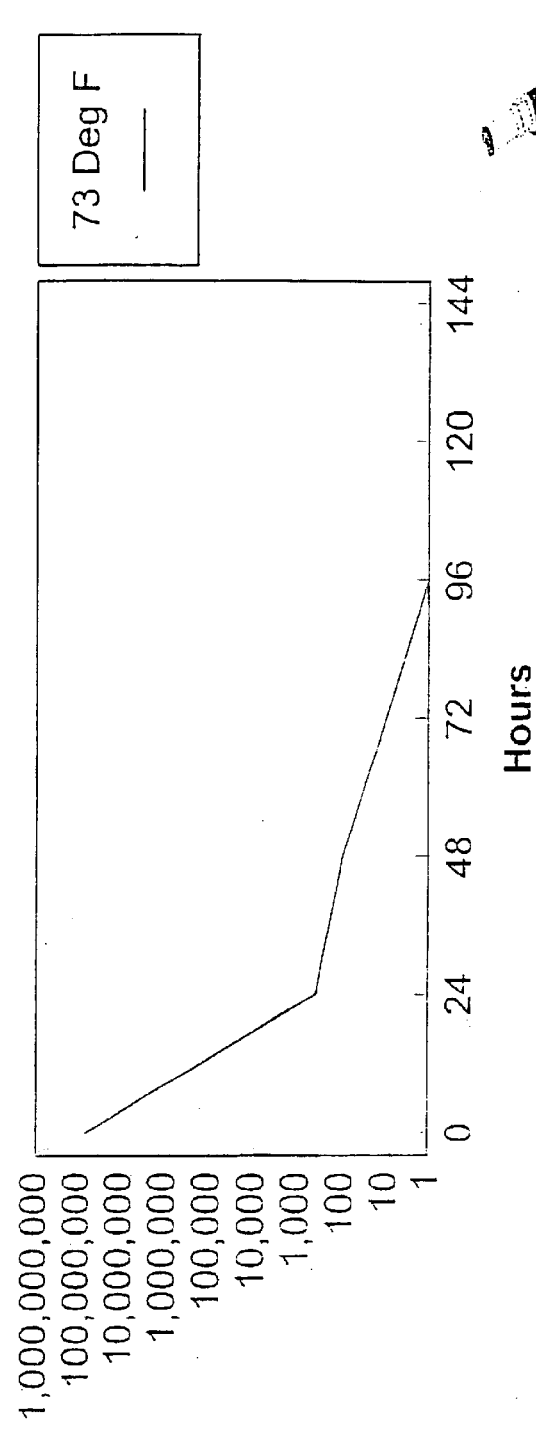
Figure 11:
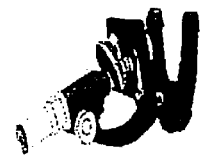
Figure 12:
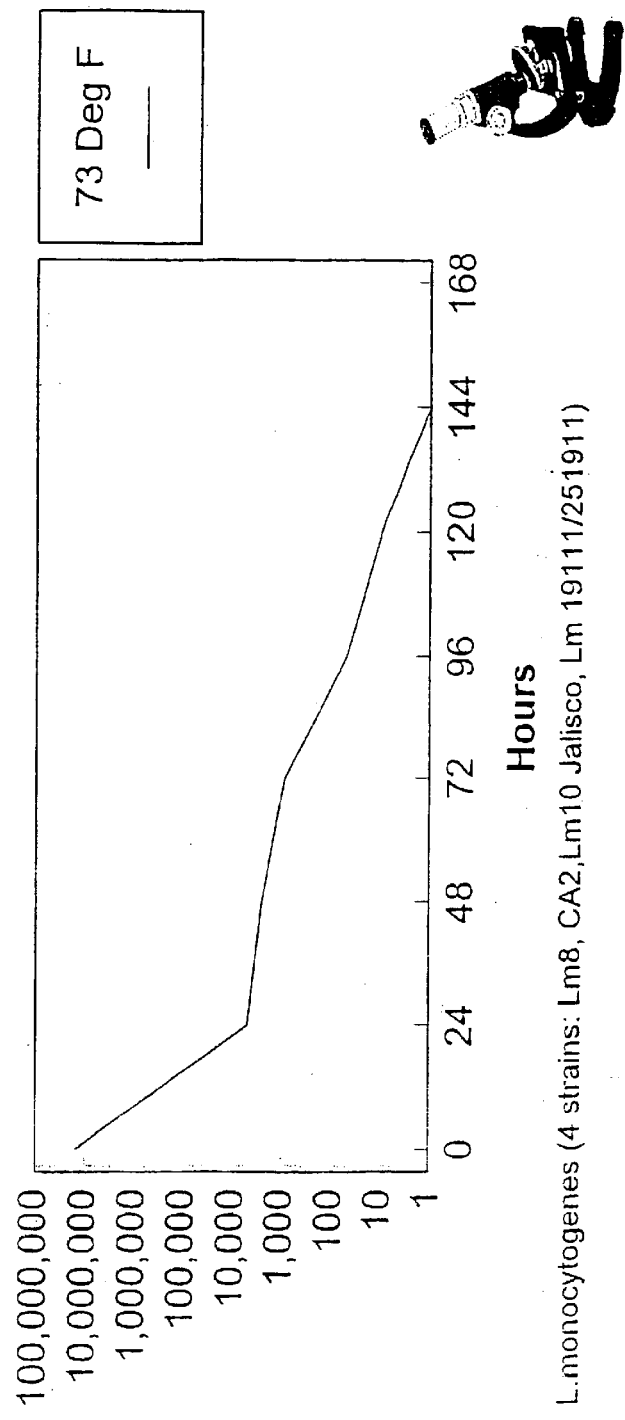

FIGS. 10, 11 and 12 represent Salmonella, E Coli and Listeria in a formulation similar to Example VI with 0.2% sorbic acid and 0.1% benzoate.

Figure 13:
Figure 13:
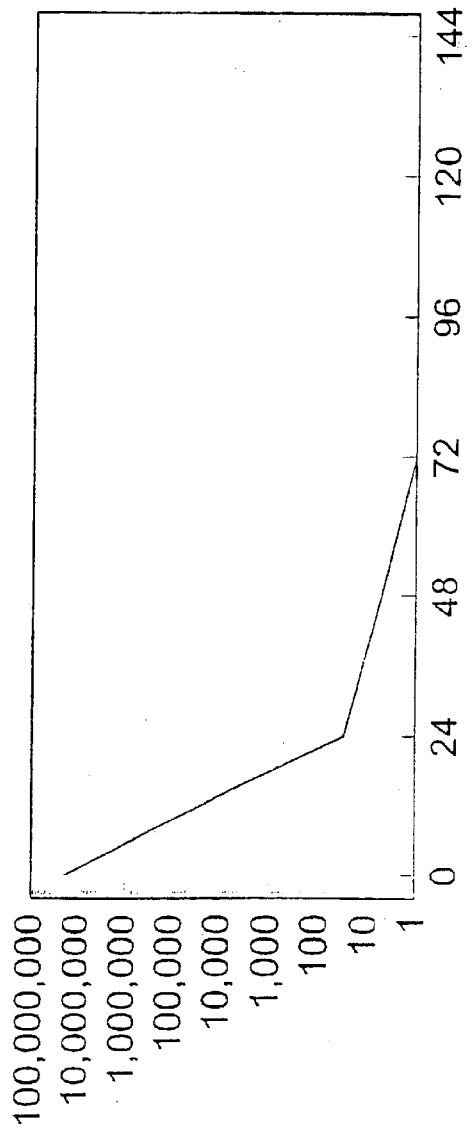
Figure 13:
Figure 14:
Figure 14:
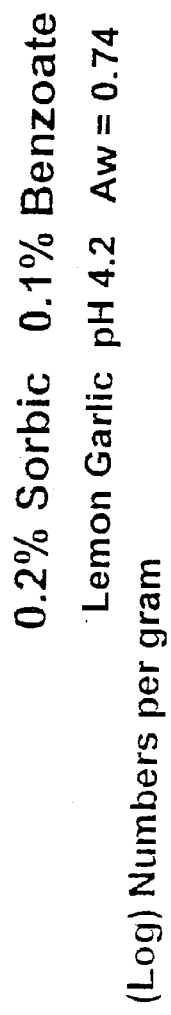
Figure 14:
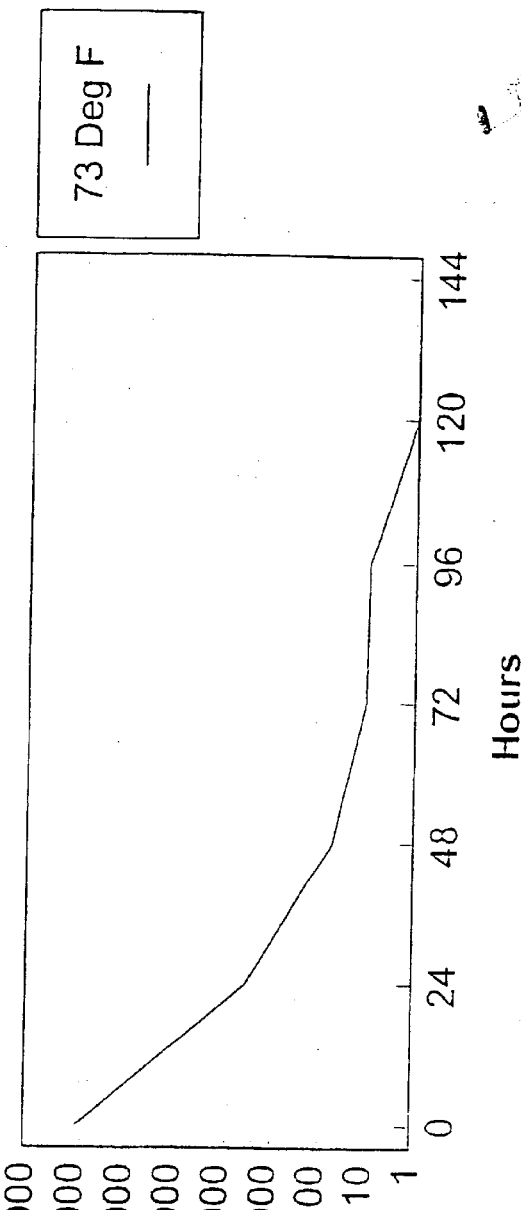
Figure 14:
Figure 15:
Figure 15:
Figure 15:
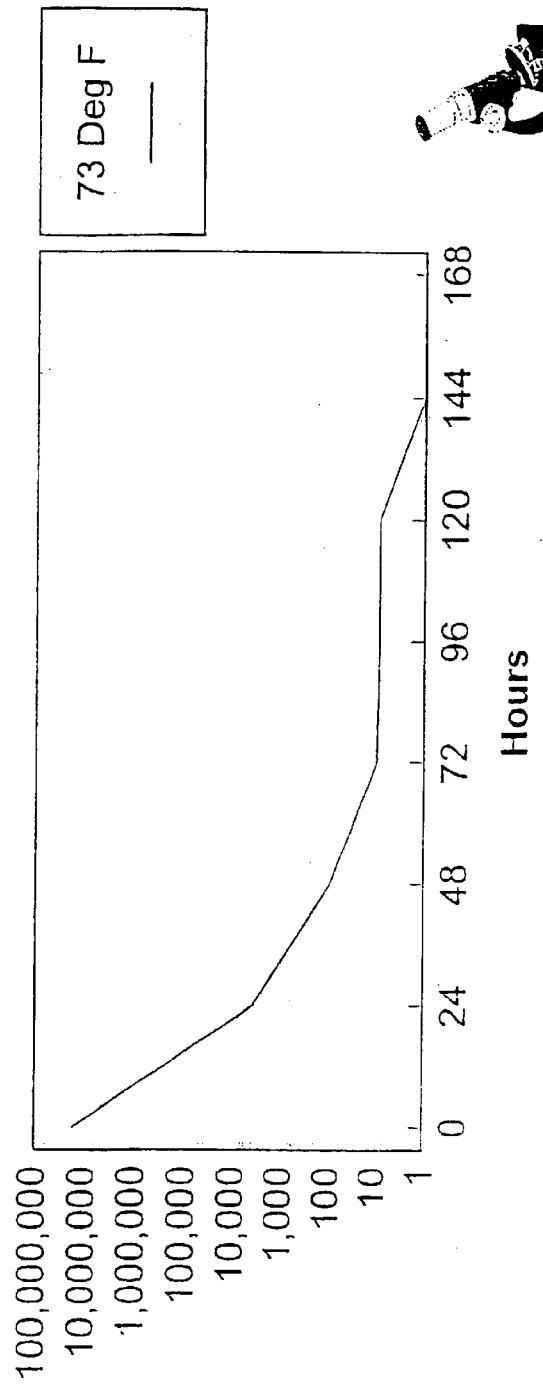

FIGS. 13, 14 and 15 represent Salmonella, E Coli and Listeria in a formulation similar to Example VII with 0.2% sorbic acid and 0.1% benzoate.

Figure 16:
Figure 16:
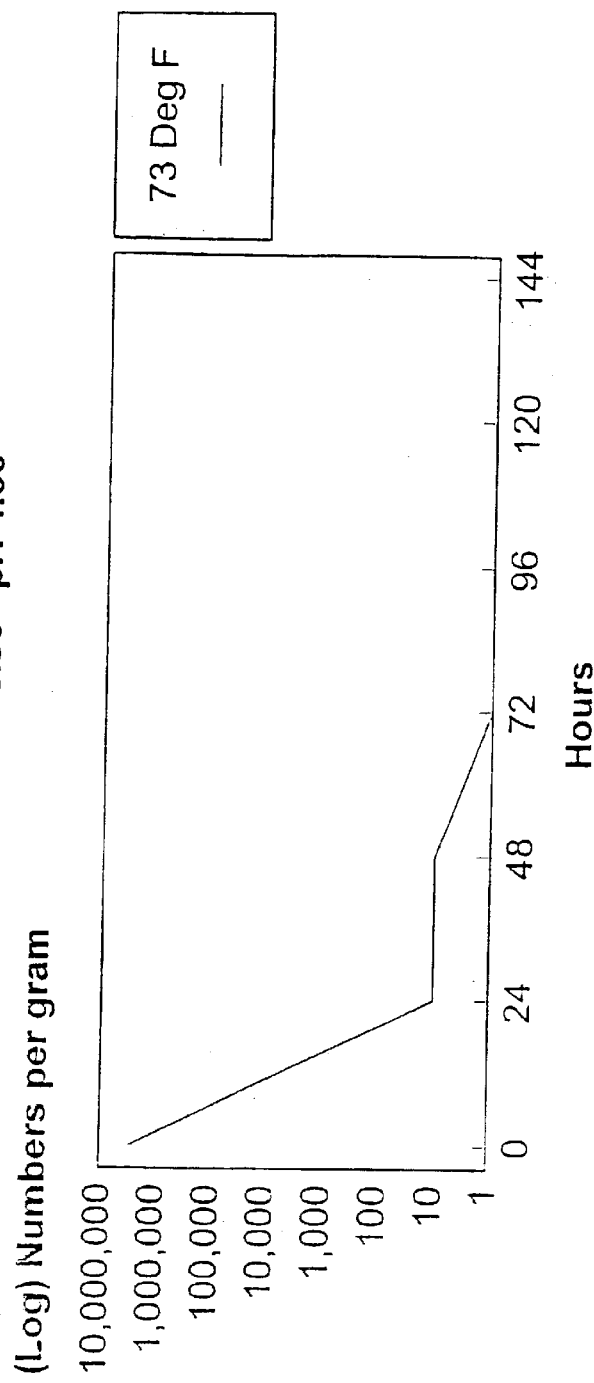
Figure 16:
Figure 17:
Figure 17:
Figure 17:
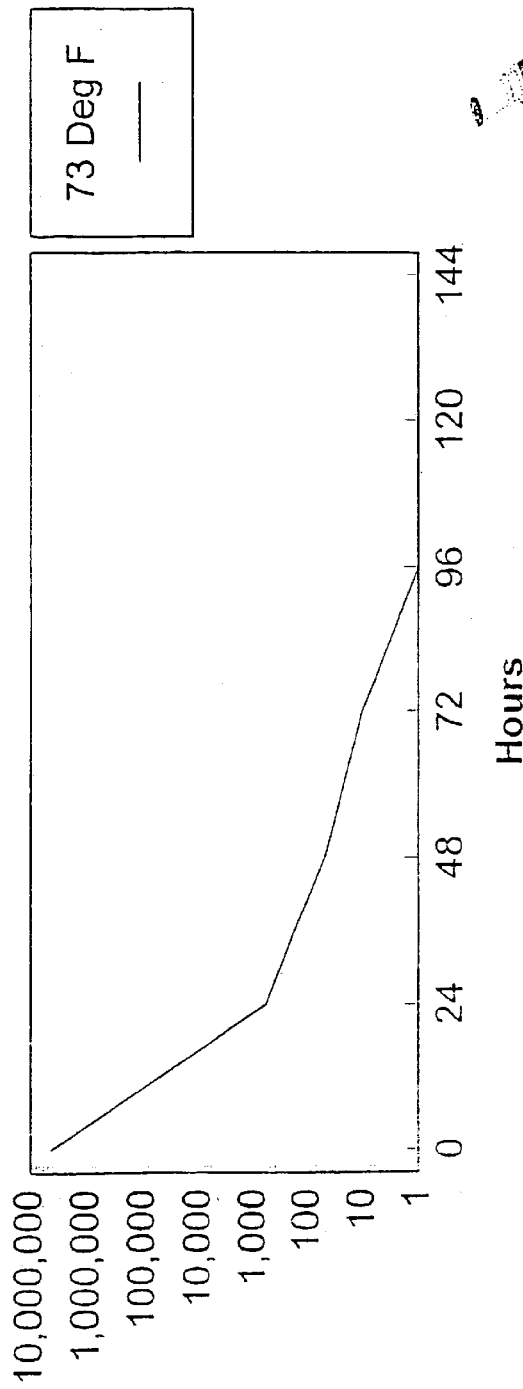
Figure 18:
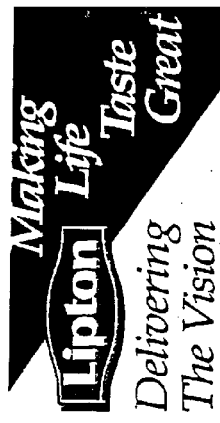
Figure 18:
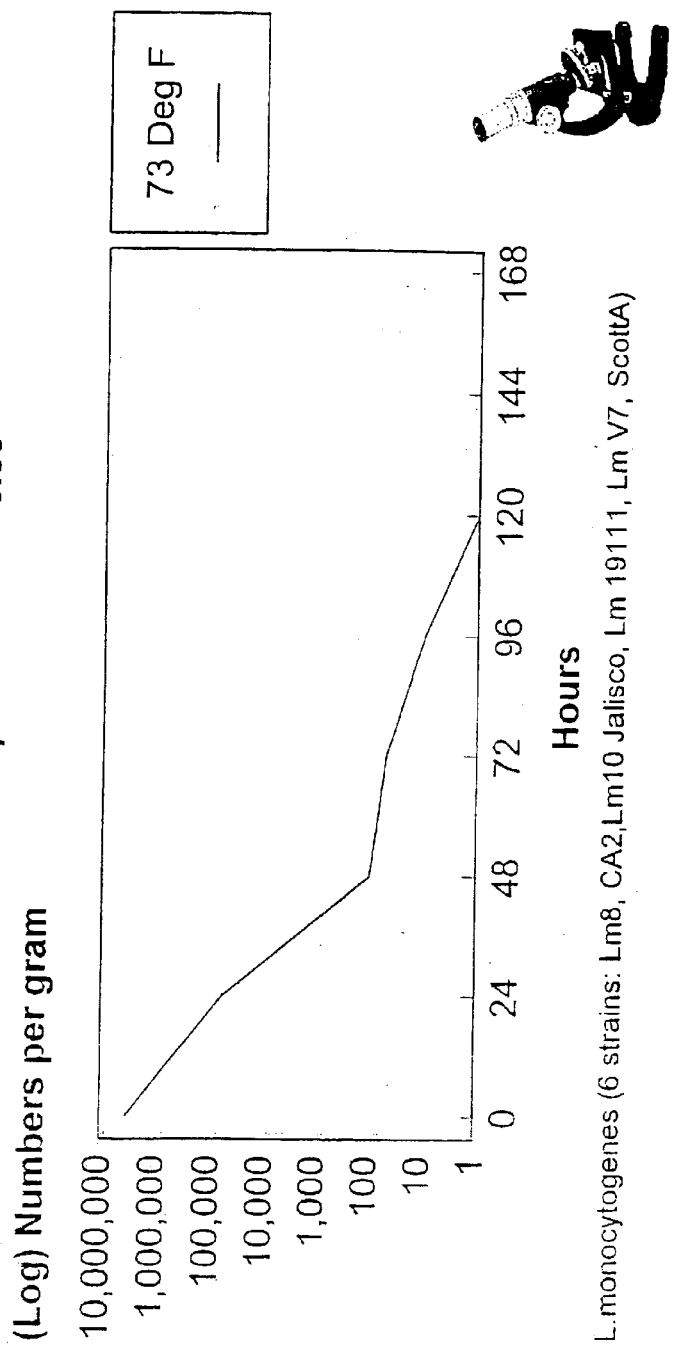

FIGS. 16, 17 and 18 represent Salmonella, E Coli and Listeria in a formulation similar to Example VIII with 0.15% sorbic acid and 0.3% benzoate.

It is understood that the examples and embodiments described herein are for illustrative purposes only and that various modifications or changes in the light thereof will be suggested to persons skilled in the art and are to be included within the spirit and purview of this application and the scope of the appended claims.

What is claimed is:

1. A combination cooking system comprising at least two functionally interdependent and complementary components, the first of said components being an edible buffer to control pH, said buffer being adapted to be responsive to the second of said components and to result in a selected pH when mixed with a final dilution of the second of said components the second of said components, being a fluid stabilized sauce having a centrifuge stability of at least about 25%, a pH of about 3 to about 5 and a water activity of about 0.5 to about 0.85.

2. The system as defined in claim 1 wherein said first component contains an amount of edible buffer sufficient to buffer the acid in said second components to a selected level.

3. The system as defined in claim 2 wherein said edible buffer is selected from the group consisting of sodium citrate, sodium phosphate, sodium carbonate, sodium hexametaphosphate, potassium citrate, potassium phosphate, potassium carbonate, potassium bicarbonate, potassium hexametaphosphate, sodium malate, potassium malate and glucono-delta lactone.

4. The system as defined in claim 2 wherein said edible buffer is a potassium, sodium, calcium or magnesium salt of an edible acid.

5. The system as defined in claim 1 wherein said second component is a fluid stabilized sauce containing about 20% to 40% water, about 15% to 40% oil and about 25% to 65% solids and a stabilization system.

6. The system as defined in claim 5 wherein said stabilization system includes emulsifier, carboxymethyl cellulose, sodium stearoyl lactylate, a gum stabilizer, a modified food starch stabilizer and a preservative.

7. The system as defined in claim 6 wherein said emulsifier is egg, said gum stabilizer is Xanthan gum and said modified food starch stabilizer is a starch derived from waxy maize.

8. The system as defined in claim 1 wherein said second component has a pH of about 4 and wherein the buffer in said first component is sodium bicarbonate.

9. The system as defined in claim 1 wherein said second component is a stable sauce having a centrifuge stability of at least about 25% comprising:
  about 20% to 40% water
  about 15% to 40% oil;
  about 25% to 65% solids, said solids including about 2% to 18% sodium chloride;
  about 1% to 2% of an emulsifier;
  about 3000 ppm to 5000 ppm of a preservative;
  about 1% to 5% of lipophilic starch;
  about 0.5% to 5% of microcrystalline cellulose;
  about 0.25% to 2% of sodium stearoyl lactylate;
  a sufficient amount of an acidulant to result in a pH of about 3.0 to about 4.6 in said stable emulsion;
  about 0.1% to 0.25% of an edible gum;
  about 1% to 12% of a heat swelling starch.

10. The system of claim 1 wherein the first component and second component when combined with liquid and diluted results in a meal having a pH of about 4–7.

11. The system of claim 1 wherein the stabilized sauce is not pasteurized.

* * * * *